(12) United States Patent
Burghart

(10) Patent No.: US 8,893,215 B2
(45) Date of Patent: Nov. 18, 2014

(54) METHOD AND APPARATUS FOR PROVIDING DISTRIBUTED POLICY MANAGEMENT

(75) Inventor: Theodore Robert Burghart, Mendon, MA (US)

(73) Assignee: Nokia Corporation, Espoo (FI)

( * ) Notice: Subject to any disclaimer, the term of this patent is extended or adjusted under 35 U.S.C. 154(b) by 682 days.

(21) Appl. No.: 12/915,969

(22) Filed: Oct. 29, 2010

(65) Prior Publication Data

US 2012/0110632 A1 May 3, 2012

(51) Int. Cl.
H04L 29/06 (2006.01)
G06F 21/60 (2013.01)
H04L 29/08 (2006.01)
H04W 4/00 (2009.01)
G06F 21/62 (2013.01)

(52) U.S. Cl.
CPC ........... *G06F 21/6218* (2013.01); *H04L 63/108* (2013.01); *H04L 63/101* (2013.01); *G06F 21/604* (2013.01); *H04L 67/10* (2013.01); *H04W 4/00* (2013.01); *H04L 63/20* (2013.01); *H04L 63/105* (2013.01); *H04L 63/107* (2013.01)
USPC ................ 726/1; 709/224; 709/225; 709/229; 710/39; 710/40; 370/236

(58) Field of Classification Search
CPC ................ H04L 63/101; H04L 63/105; H04L 63/104–63/108; H04L 63/20; H04L 67/10; H04W 4/00; G06F 21/604
USPC ........... 726/1; 709/223–225, 229; 710/39–40; 370/236
See application file for complete search history.

(56) References Cited

U.S. PATENT DOCUMENTS

| 7,171,411 | B1 | 1/2007 | Lewis et al. |
| 2003/0115322 | A1* | 6/2003 | Moriconi et al. ............. 709/224 |
| 2006/0136437 | A1 | 6/2006 | Yamasaki |

(Continued)

FOREIGN PATENT DOCUMENTS

WO    WO 00/25214 A1    5/2000

OTHER PUBLICATIONS

Perich, F.; "Policy-Based Network Management for NeXt Generation Spectrum Access Control"; New Frontiers in Dynamic Spectrum Access Networks, 2007. DySPAN 2007. 2nd IEEE International Symposium on Digital Object Identifier: 10.1109/DYSPAN.2007.72; Publication Year: 2007 , pp. 496-506.*

(Continued)

*Primary Examiner* — Hadi Armouche
*Assistant Examiner* — Angela Holmes
(74) *Attorney, Agent, or Firm* — Ditthavong & Steiner, PC

(57) ABSTRACT

An approach is provided for distributed policy management and enforcement. A policy manager determines one or more domains of an information system. The one or more domains are associated at least in part with respective subsets of one or more resources of the information system. The policy manager also determines one or more respective access policies local to the one or more domains. The one or more respective access policies configured to enable a determination at least in part of access to the respective subsets, the one or more resources, or a combination thereof. At least one of the one or more respective access policies is configured to operate independently of other ones of the one or more respective schemas.

20 Claims, 8 Drawing Sheets

(56) References Cited

U.S. PATENT DOCUMENTS

2006/0248599 A1 11/2006 Sack et al.
2007/0214497 A1* 9/2007 Montgomery et al. ............ 726/4
2008/0066147 A1* 3/2008 Dillaway et al. .................. 726/1

OTHER PUBLICATIONS

Marx, R.; et al.;"Security Concept for Distributed Service Execution Environments"; Wireless Communications and Networking Conference, 2008. WCNC 2008. IEEE Digital Object Identifier: 10.1109/WCNC.2008.550; Publication Year: 2008, pp. 3151-3156.*

A Framework for Supporting Distributed Access Control Policies, Zhou et al., Proceedings of the 10th IEEE Symposium on Computers and Communications (ISCC 2005), IEEE, 2005, pp. 1-6.

OASIS Security Services (SAML) TC, Hardjono et al., Jun. 17, 2008, http://www.oasis-open.org/committees/tc_home.php?wg_abbrev=security, pp. 1-3.

OASIS Web Services Security (WSS) TC, Nov. 28, 2006, http://www.oasis-open.org/committees/tc_home.php?wg_abbrev=wss, pp. 1-4.

Security Domain Membership Management Specification, OMG Adopted Specification, May 2002, http://www.omg.org/cgi-bin/doc?ptc/02-05-02.pdf, pp. 1-68.

International Search Report for related International Application No. PCT/FI2011/050918 dated Mar. 28, 2012, pp. 1-5.

International Written Opinion for related International Application No. PCT/FI2011/050918 dated Mar. 28, 2012, pp. 1-9.

* cited by examiner

METHOD AND APPARATUS FOR PROVIDING DISTRIBUTED POLICY MANAGEMENT

BACKGROUND

Service providers (e.g., wireless, cellular, etc.) and device manufacturers are continually challenged to deliver value and convenience to consumers by, for example, providing compelling network services. One area of development has been related to services that provide access to growing stores of information from different distributed sources. As a result, information owned and/or controlled by various entities (e.g., service providers, content providers, users, etc.) may often be distributed over various decentralized servers, storage components, nodes, etc. of a distributed information system. Moreover, at least some of the information may be subject to one or more access control policies (e.g., restrict access to one or more resources of the information system to authorized users). As a result, service providers and device manufacturers face significant technical challenges to managing and/or enforcing such policies over an information system, particularly when the information is highly distributed or contains a high number of resources and corresponding access policies.

SOME EXAMPLE EMBODIMENTS

Therefore, there is a need for an approach for providing distributed policy management and enforcement over an information system.

According to one embodiment, a method comprises facilitating a creation and/or a modification of at least one device user interface element, at least one device user interface functionality, or a combination thereof based, at least in part, on information, data, and/or a signal resulting from a local and/or remote determination of one or more domains of an information system. The one or more domains are associated at least in part with respective subsets of one or more resources of the information system. The information, the data, and/or the signal further results from a local and/or remote determination of one or more respective access policies local to the one or more domains. The one or more respective access policies are configured to enable a determination, at least in part, of access to the respective subsets, the one or more resources, or a combination thereof. At least one of the one or more respective access policies is configured to operate at least in part independently of other ones of the one or more respective access policies.

According to one embodiment, a method comprises determining one or more domains of an information system. The one or more domains are associated at least in part with respective subsets of one or more resources of the information system. The method also comprises determining one or more respective access policies local to the one or more domains. The one or more respective access policies are configured to enable a determination at least in part of access to the respective subsets. At least one of the one or more respective access policies is configured to operate at least in part independently of other ones of the one or more respective access policies.

According to another embodiment, an apparatus comprising at least one processor, and at least one memory including computer program code, the at least one memory and the computer program code configured to, with the at least one processor, cause, at least in part, the apparatus to determine one or more domains of an information system. The one or more domains are associated at least in part with respective subsets of one or more resources of the information system. The apparatus is also caused to determine one or more respective access policies local to the one or more domains. The one or more respective access policies are configured to enable a determination at least in part of access to the respective subsets, the one or more resources, or a combination thereof. At least one of the one or more respective access policies is configured to operate at least in part independently of other ones of the one or more respective access policies.

According to another embodiment, a computer-readable storage medium carrying one or more sequences of one or more instructions which, when executed by one or more processors, cause, at least in part, an apparatus to determine one or more domains of an information system. The one or more domains are associated at least in part with respective subsets of one or more resources of the information system. The apparatus is also caused to determine one or more respective access policies local to the one or more domains. The one or more respective access policies are configured to enable a determination at least in part of access to the respective subsets, the one or more resources, or a combination thereof. At least one of the one or more respective access policies is configured to operate at least in part independently of other ones of the one or more respective access policies.

According to another embodiment, an apparatus comprises means for determining one or more domains of an information system. The one or more domains are associated at least in part to respective subsets of one or more resources of the information system. The apparatus also comprises means for determining one or more respective access policies local to the one or more domains. The one or more respective access policies are configured to enable a determination at least in part of access to the respective subsets, the one or more resources, or a combination thereof. At least one of the one or more respective access policies is configured to operate at least in part independently of other ones of the one or more respective access policies.

According to another embodiment, a method comprises facilitating access to at least one interface configured to allow access to at least one service, the at least one service configured to determine one or more domains of an information system. The one or more domains are associated at least in part with respective subsets of one or more resources of the information system. The at least one service is further caused to determine one or more respective access policies local to the one or more domains. The one or more respective access policies are configured to enable a determination at least in part of access to the respective subsets, the one or more resources, or a combination thereof. At least one of the one or more respective access policies is configured to operate at least in part independently of other ones of the one or more respective access policies.

According to another embodiment, a computer program product including one or more sequences of one or more instructions which, when executed by one or more processors, cause an apparatus to determine one or more domains of an information system. The one or more domains correspond to respective subsets of one or more resources of the information system. The apparatus is also caused to determine one or more respective access policies local to the one or more domains. The one or more respective access policies are configured to enable a determination at least in part of access to the respective subsets, the one or more resources, or a combination thereof. At least one of the one or more respective access policies operates at least in part independently of other ones of the one or more respective access policies.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing distributed policy management are disclosed. In the following description, for the purposes of explanation, numerous specific details are set forth in order to provide a thorough understanding of the embodiments of the invention. It is apparent, however, to one skilled in the art, that the embodiments of the invention may be practiced without these specific details or with an equivalent arrangement. In other instances, well-known structures and devices are shown in block diagram form in order to avoid unnecessarily obscuring the embodiments of the invention.

Figure 1:
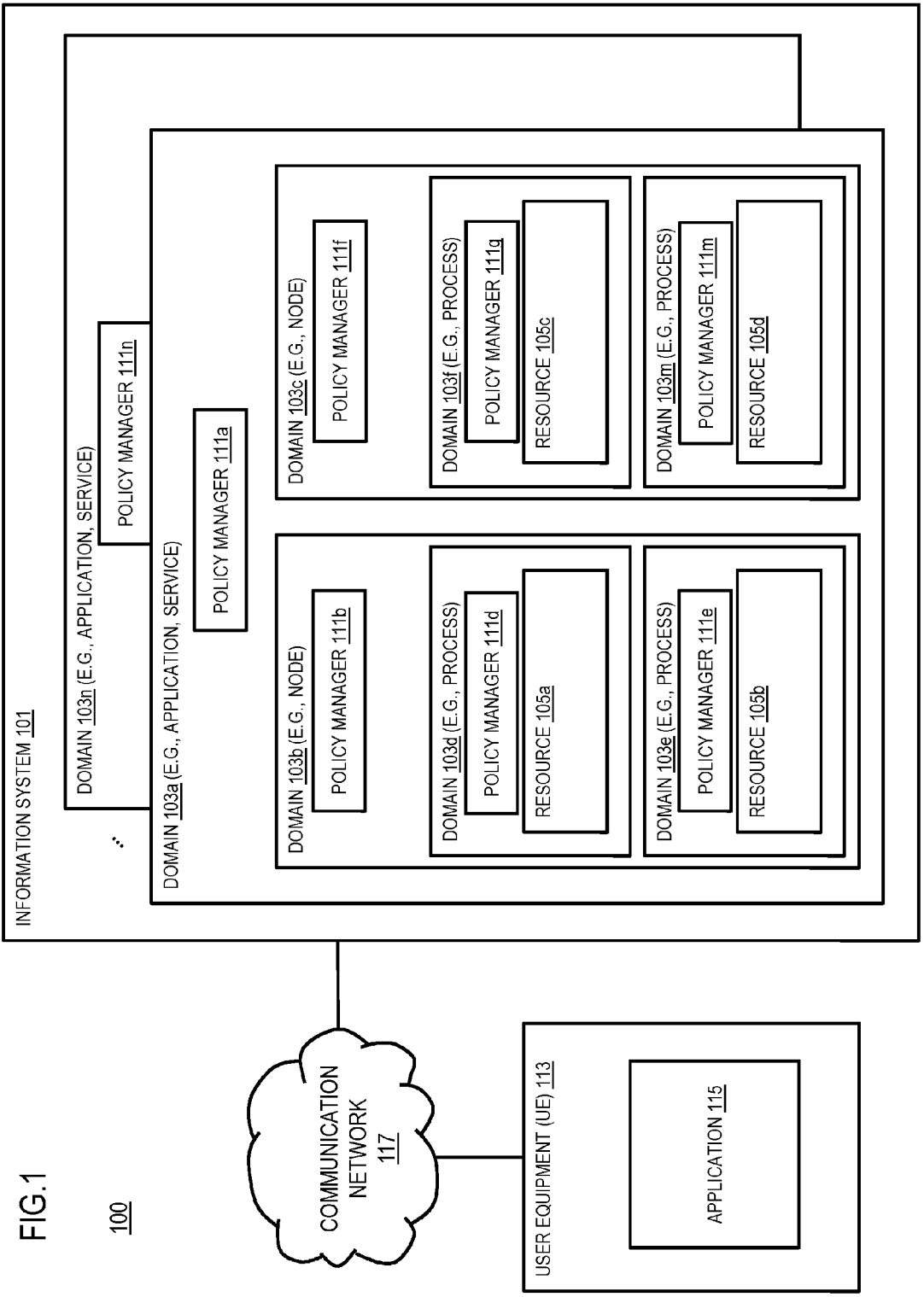
FIG. 1 is a diagram of a system capable of providing distributed policy management, according to one embodiment.

FIG. 1 is a diagram of a system capable of providing distributed policy management, according to one embodiment. As services become increasingly dependent on distributed information systems, service providers are discovering that traditional approaches to managing and/or enforcing access control policies (e.g., security policies, privacy policies, access rights, visibility rights, etc.) over resources within these distributed systems become less efficient and more resource-intensive, particularly as the systems scale up in size. By way of example, traditional information system implementations employ centralized policy management components (e.g., Policy Administration Points (PAPs), Policy Decision Points (PDPs), and Policy Enforcement Points (PEPs)) to manage and enforce applicable policies. For example, a PAP is a logical point at which schemas for defining access control policies and/or the actual control policies themselves are defined. In one embodiment, the term "schema" refers to a convention for specifying disparate resource types of an information system and their associated attributes, rules, policies, and the like related to access control. In addition, the term "policy" refers to principles and rules set up by an information system, information owners, information custodians, users, and the like to protect resources (e.g., information resources, processes, nodes, etc.) within the information system against unauthorized access and/or to provide various levels of authorization (e.g., read-only, read/write, etc.) to the resource. In a centralized system, for instance, one or more PAPs distribute the access control policies to one or more PDPs which are the logical points at which requests to access a particular resource is made. The PDPs then relate any access decisions to PEPs which are the logical points at which the access decisions are applied, for example, to grant, deny, or otherwise restrict access to the resource.

In other words, traditional systems place the responsibility for policy management in one or more centralized components that enforce policies (e.g., access policies) over all resources within an information system. In some embodiments, traditional systems may fragment and/or replicate one or more of the policy management components to increase availability. However, such a fragmented or replicated system still generally operates on a logically contiguous or centralized view of policies and the resources to which the policies apply. In addition, characteristics of specific data types associated with the various resources of the information system typically are accounted for in a "central repository" of access control evidence and rules. Maintaining such a repository for modern distributed systems where there are potentially trillions of resources and corresponding data types and access policies can expend considerable resources. With respect to connectivity, for instance, the policies, resource types, etc. typically are transmitted from central components to more distant components to ensure consistency of policy management and enforcement throughout the system, thereby expending network, computing and other resources.

One example of a large distributed information system is a "semantic web." As used herein, the term "semantic web" refers to a universal medium for data, information, and knowledge exchange based on computer-comprehensible meaning (semantics) derived from the data, information, or knowledge. In one embodiment, the semantic web is set of interconnected or otherwise related documents, data, information, knowledge, or a combination thereof. By way of example, knowledge or information in the semantic web is generally structured and organized at a finer level of granularity than information or knowledge contained within free-text documents. Moreover, the vocabulary used within semantic webs includes not only literal words but also identifiers, pointers, or other similar references to information.

Semantic web technologies are typically designed to build on distributed and disparate datasets. Accordingly, the underlying relationship model of semantic webs presents challenges to both the definition and enforcement of access control policies (e.g., security policies, privacy policies, etc.). It is noted that one of the core goals of this relationship model is to leverage inferred relationships between information that otherwise has not explicit coupling. Because inferred relationships are ephemeral by nature, the access control policies governing them are generally deduced from the policies governing the elements that contribute to the relationship—policies that may themselves be implicit. In this environment, it becomes difficult to envision the potential scope (e.g., the extent to which policies or rules may cascade or apply from centralized components that are logically distant from the resource being accessed) of any but the most simplistic access control rules.

To address this problem, a system 100 of FIG. 1 introduces the capability to provide distributed policy management and enforcement over resources of an information system. More specifically, the system 100 supports management and enforcement of access control policies at or near a resource access point by defining localized access control policies based at least in part on local schema at a domain or resource level within the information system 101. As used herein, the local schema refers to rules governing the formats of the information (e.g., data types, documents, files, etc.) to which the policies apply and, in some embodiments, the access policies themselves. In one embodiment, the boundary of the domains defined with the information system 101 represents a potential authorization scope that is subject to its own local access policies and related schema for enforcing access control policies according to its own mechanisms. In some embodiments, domains may be nested so that access control can be applied independently but sequentially. For example, an information system may include a larger domain corresponding to a file sharing service. The service may authenticate user access to the service domain by a simple username and password challenge. Once authenticated at this level, the user receives authority to operate within the domain. However, this authority to operate may not extend to all resources within the service domain. For example, if the file sharing service also includes a set of files with additional access restrictions (e.g., files that only employees of a particular company can access), then the system 100 can apply a local access control schema independent of the schema used for access at the service domain level. In this case, the file domain may independently apply a completely separate schema (e.g., a schema to authenticate the user as an authorized employee with access to the files) before authorizing access into the file domain.

In various embodiments of the approach described herein, the access policy or policies applied at the service level need not be aware of or coordinate with the access policy applied at the file level and vice versa. At each domain, the system 100 need only inquire whether access should be granted to the domain or layer in question. In one embodiment, requests to enter or access the domain or its authorization scope (e.g., the resources bounded by the domain) are layered so that access denial at the boundary of a domain encompassing subordinate domains prevents any further penetration to the subordinate or nested domains.

In this way, the local access policies operate independently of other access policies associated with other domains of the information system 101. In other words, an access policy and/or its related schema that are local to a particular domain generally need not have any dependencies (e.g., resource type definitions, policies, rules, etc.) on any other access policies or schema defined over the network, thereby advantageously enabling independent management and enforcement access control policies on a domain-by-domain basis. In this way, the local access control schemas of the system 100 operate autonomously to avoid the resource burden associated with communicating information regarding new or modified resource types and corresponding policies from a centralized component to dependent policy management and enforcement components.

In addition, the distributed policy management approach of the system 100 enables greater flexibility in adding or modifying resource types because these changes can be performed locally at the domain without incurring the burden associated with propagating the changes to centralized access control components and/or other access control components of the information system 101. Other advantages of the approach described herein include: (1) enabling local administrators (e.g., administrators who may have more specific needs or knowledge of local resources) to tailor access control policies to specific domains; (2) enabling the removal of dependencies resulting from centralized data or resource type definitions (e.g., enabling the system 100 to define specific types that may only be applicable to a particular domain 103 or subset of the domains 103 of the information system 101); (3) providing efficient scalability of the information system 101 by enabling the addition of access control components for new resources and/or domains without maintaining a central repository.

As shown in FIG. 1, in one embodiment, the information system 101 consists of one or more domains (e.g., domains 103a-103n—also collectively referred to as domains 103) that define or otherwise encompass respective subsets of resources (e.g., resources 105a-105d—also collectively referred to as resources 105) within the information system 101. By way of example, a resource 105 can be any element within the information system 101 upon which an operation (e.g., an access operation) may be performed. It is contemplated that the resource 105 may be active (e.g., a server process) or passive (e.g., a file). Furthermore, in one embodiment, it is contemplated that a domain 103 can include any collection of resources (e.g., both active and passive elements) within the information system 101. In some embodiments, the boundaries of the domains 103 may be determined statically or dynamically to identify what resources are included in the domain 103.

As an example, FIG. 1 illustrates domains 103 that encompass different boundaries and/or hierarchies of resources 105 within the information system 101. In one embodiment, the information system 101 may represent an aggregation of services, such as Nokia's Ovi Services, that span a variety of services that fall within a common or shared access control infrastructure (e.g., the distributed policy structure described herein). Furthermore, it is contemplated that the domains may be nested wherein the boundaries of the respective domains form layers within the information system 101. For example, the domain 103a defines resources (e.g., processes, files, data, etc.) that constitute, for instance, an application or service within the information system 101. As described, the information system 101 (e.g., which may itself represent a top level domain) may include any number of domains (e.g., domains 103a and 103n) that represent any number of applications, services, or other subset of resources 105. In this example, the domain 103a represents an application or service that is further divided into subordinate domains 103b and 103c (e.g., each representing a node or server of the parent domain 103a). Each respective domain 103b and 103c is further divided into other subordinate domains (e.g., domains 103d and 103e of domain 103b; and domains 103f and 103m of domain 103c).

For each of the domains 103a-103m at different layers, levels, or points of the information system 101, there are associated policy managers 111a-111m (also collectively referred to as policy managers 111) for enabling the distributed policy management approach described herein. In this way, the policy managers 111 enable the definition, management, and enforcement of local access control schemas for the resources 105 of their respective domains 103. The distributed policy management infrastructure of the system 100 recognizes that policies applied to broad system in a centralized manner are often abstract, as the centralized policies typically focus on common generalizations (e.g., regarding resource data types) across the various components of a distributed system. As a result, the policy manager 111 places the functions of the PAP, PDP, and PEP in the corresponding local domain 103 where the policy manager 111 need not generalize policies that cover resources not present in the domain 103.

In one embodiment, with respect to a particular domain 103, the local policy manager 111 operates under an explicit grammar (e.g., the OASIS eXtensible Access Control Markup Language (XACML)) to express a logical strategy to manage and enforce access control policies according to the local schema. By way of example, XACML specifies a declarative grammar for expressing access control rules in eXtensible Markup Language (XML) and a process model for their evaluation. In another embodiment, source or program code can be attached or otherwise associated with specific domains 103 and/or resources 105 (e.g., as associated metadata). The policy manager 111 can then extract the source code appropriate for an implementing platform, server, or node. The source code is then, for instance, translated into machine instructions and linked with appropriate runtime libraries to produce an executable image that can be loaded and executed by the implementing platform, server, or node to enforce local access control policies. In one embodiment, the executable, compiled, or linked code can be cached at the respective policy manager 111 for later use.

In another embodiment, any of the domains 103 and/or resources 105 may be associated with one or more schemas, one or more attributes, one or more rules, source code, binary code, one or more implementation libraries with respect to determining access, managing access control policies, enforcing access control policies, and the like. Generally, an attribute can be any characteristic of the information system 101, the domains 103 (e.g., applications, services, nodes, servers, processes, etc.), and/or resources 105 that can direct the definition, management, and/or enforcement of the local access policies. The rules provide decision criteria, guidelines, etc. for determining whether to grant, deny, or otherwise restrict access to a domain 103 or resource 105 when implemented in the executable image.

By way of example, generation, compilation, use, etc. of the executable image can be triggered by receiving a request to access a domain 103 and/or resource 105. In one embodiment, an access is an action or operation undertaken to make use of a domain 103 or resource 105. Access includes operations such as read and write on storage objects, as well as commands to perform operations on functional objects. The request is typically a message or signal from an entity (e.g., an actor such as a user or application) whose response is the result of performing some access operation. By way of example, possible outcomes to servicing a request includes: (1) the access operation is performed and the result returned, (2) permission to perform the operation is denied, and (3) a failure occurred preventing any of the first or second outcomes. In one embodiment, as shown in FIG. 1, the access request may originate from a user equipment (UE) 113 and/or an application 115 executing on the UE 113 over, for instance, a communication network 117 with connectivity to the information system 101. Although various embodiments are discussed with respect to providing distributed policy management of a network, it is also contemplated that requests and responses related to distributed policy management may be conveyed over other communication paths, including, for example, intra- or inter-process communication within a host, asynchronous message queues, etc.

Under the various example approaches described herein, it is noted that access control in a broad distributed system can be achieved by distributed application of independent local access control policies and related schemas at numerous touch points (e.g., at the boundaries of the domains 103 or on requesting access of a resource 105) throughout the system 100. In one embodiment, these layered access controls are applied and monitored at multiple separate enforcement and reporting points (e.g., at the policy managers 111) corresponding to or near the point of resource access. The distribution of policy management and enforcement, for instance, at the boundaries of the domains 103, enables discrete or independent policy elements and schemas to be applied in serial, parallel, and/or redundant patterns to support various availability, throughput, and defensive goals within the information system 101.

By way of example, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 113 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 113 can support any type of interface to the user (such as "wearable" circuitry, etc.).

As noted previously, in one embodiment, the domains 103 and/or resources 105 (e.g., processes, information) are distributed throughout the information system 101 within a semantic web environment. For example, the domains 103, resources 105, and related information may be identified as public, which makes it accessible to any other user having connectivity to the information system 101 via the communication network 117, or may have been made private, where the owner can decide the level of accessibility by using policies enforced by the distributed policy managers 111. In some embodiments, the policies, domains 103, and resources 105 may be associated with attributes such as owner of the information, source of the information, keys associated with the information (e.g. access keys, encryption/decryption keys), etc. and other metadata to facilitate management and enforcement of access control policies.

By way of example, in semantic web environments, resources 105 and/or related information may be represented using a common syntax such as Resource Description Framework (RDF). RDF is a family of World Wide Web Consortium (W3C) specifications originally designed as a metadata data model. It has come to be used as a general method for conceptual description or modeling of information that is implemented in web resources using a variety of syntax formats. The underlying structure of any expression in RDF is a collection of triples, each consisting of three disjointed sets of nodes including a subject, a predicate, and an object. A set of such triples is called an RDF graph.

TABLE 1

| Subject | Predicate | Object |
|---|---|---|
| uri://....../rule#CD-introduction, | rdf:type, | uri://............/Rule |
| uri://....../rule#CD-introduction, | uri://....../rule#assumption, | "c" |

In an embodiment of the approach described herein, the basic structure of an RDF triple (e.g., which includes a subject, a predicate, and an object (s, p, o)) can be extended by adding additional fields for metadata (e.g., data that describes the information) related to any applicable policies. By way of example, some of these additional fields may describe the information owner (e.g., a link to the owner identification information such as a user name, device identifier, federated identifier, token, etc.), information source (e.g., a link to the system of record or the authoritative data source for the information), and the set of keys associated with that particular triple of information. The keys, for instance, correspond to one or more policies associated with the domains 103 and/or resources 105. In one embodiment, the system 100 generates a key based, at least in part, on a hash of the corresponding plain text policy. In some embodiments, the keys are encrypted or managed using a public key infrastructure (PKI). Other fields representing metadata associated with an RDF triple (e.g., attributes, rules, source code, binary code, implementation libraries, etc.) may be present in the extended triple. In other embodiments, the policy metadata may be represented using separate first class structures associated with the domains 103 and/or resources 105.

In one embodiment, an access control policy may be represented by a data structure that contains data such as a set of rules applied by the policy, a set of operations that can be performed on the corresponding domain 103 and/or resources 105 and their application is controlled by the policy (e.g. read, write, get, find, etc.), one or more keys for the policy (e.g. for policy validation), one or more hash for the policy (e.g. for decoding/encoding the keys), the owner of the policy, etc. In this embodiment, policy definitions are stored and accessed by the distributed policy managers 111.

In another embodiment, each instance of policy may be addressable by application of a mechanism. For example, a mechanism can be some URI(s) in an RDF store or some keys in the domains 103 and/or resources 105. If the policies are stored as RDF structures, they can be addressable via unique URIs. In one embodiment, the inclusion of the owner field in a policy structure provides an additional verification that can be performed by the policy manager 111 to check whether the policies, rules, schemas, attributes, source code, binary code, implementation libraries, or other metadata associated with the domains 103 and/or resources 105 are valid (e.g., have consistent owners, associated with appropriate authentication keys, etc.).

By way of example, the components of the system 100 communicate with each other and other components of the communication network 117 using well known, new, or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6, and layer 7) headers as defined by the OSI Reference Model.

In one embodiment, the UE 113, the application 115, and the information system 101 (e.g., the domains 103 and resources 105) interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

In another embodiment, the client-server model may apply to interactions between the UE 113 and the application 115 with one or more of the policy managers 111. By way of example, a user may execute the application 115 to view available personal photographs. In one embodiment, the user can generate one or more access control polices and attach the policies to the one or more of the personal photographs to limit or restrict access the resource. In some embodiments, the application 115 and/or UE 113 can generate the access control policies locally. Then, on receiving a request for access to the resource (e.g., personal photographs), the application 115 and/or the UE 113 can request that a backend component (e.g., the policy manager 111 resident on the network 117) interpret and/or evaluate the access requests against the attached access control policy to render an access decision. In one embodiment, the UE 113 and/or the application 115 can then present the access decision on a user interface of the UE 113. In this case, even though the interpretation and evaluation of the access decision occurs at a remote location, the access control policy remains nonetheless local to the resource domain 103 of the device because the access control policy operates over the authorization scope of the local domain 103.

Figure 2:
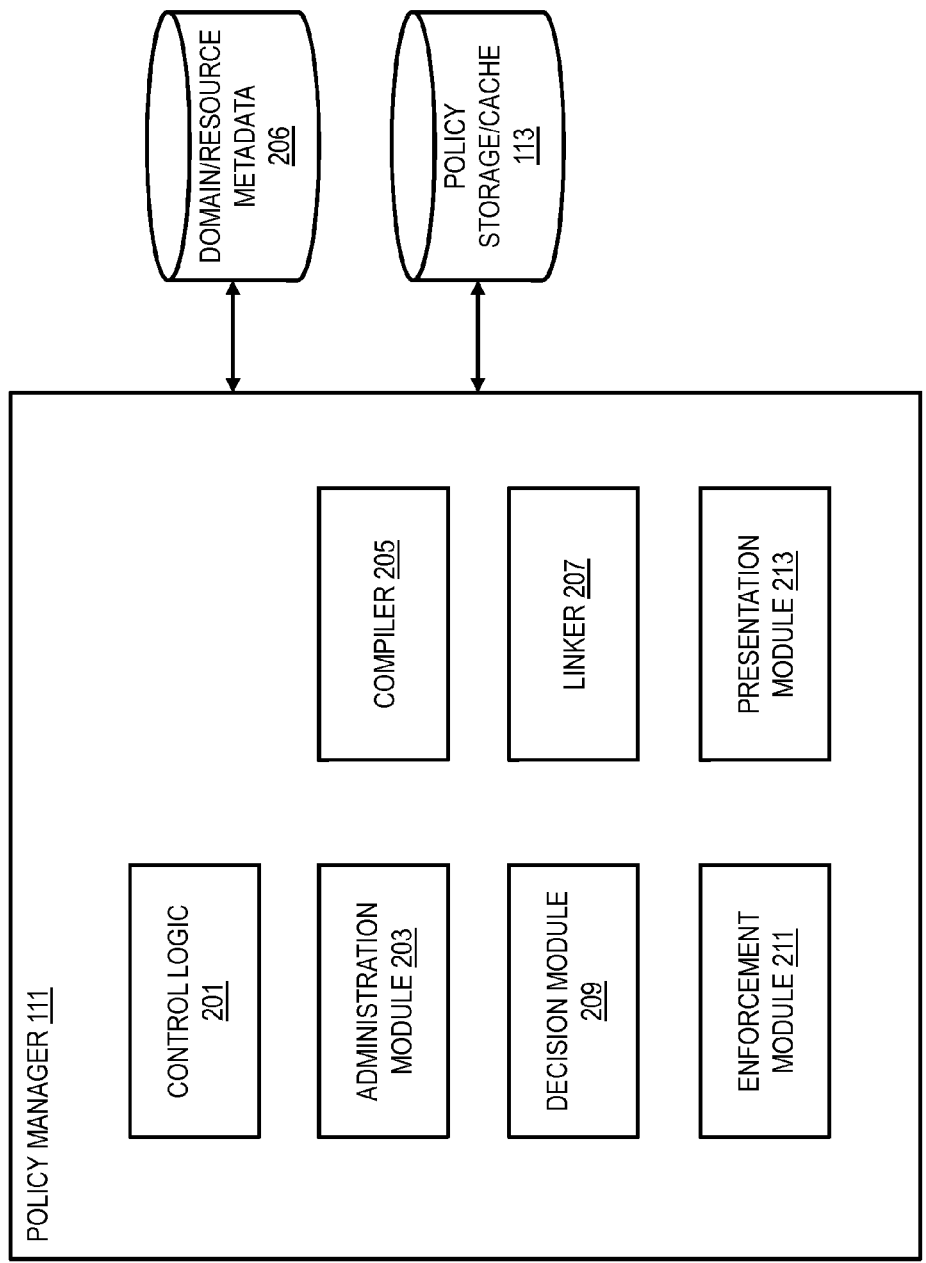
FIG. 2 is a diagram of the components of a policy manager, according to one embodiment.

FIG. 2 is a diagram of the components of policy management infrastructure, according to one embodiment. By way of example, the network management platform 103 includes one or more components for fetching data based on network conditions. It is contemplated that the functions of these components may be combined in one or more components or performed by other components of equivalent functionality. In addition, it is contemplated that any one of the components of the policy manager 111 servicing a particular domain may provide or share components with other policy managers 111. For example, a component may be shared-by-reference (e.g., incorporated into one policy manager 111 by sharing or establishing a connectivity link with the component in another policy manager 111).

In this embodiment, the network management platform 103 includes at least a control logic 201 which executes at least one algorithm for performing functions of the policy manager 111. For example, the control logic 201 interacts with an administration module 203 to identify, determine, and/or bound at least a subset of the resources 105 of the information system 101 into a domain 103. In some embodiments, the domain 103 may have already been identified by the policy manager 111 or another component of the system 100 or the information system 101 (e.g., a service provider, content provider). In one embodiment, the determination of the domain may be performed prior to or concurrent with determining or establishing the boundaries of a particular domain 103. It is also contemplated that a resource 105 may be included in more than one domain 103 and that domains 103 may overlap in scope. As noted earlier, the domains 103 may be defined statically (e.g., by explicitly identifying each resource 105 to include) or dynamically (e.g., by specifying criteria and then evaluating candidate resources 105 against the criteria for inclusion the domain 103). The administration module 203 then defines the local access policy for the domain 103 according to a schema specific to the domain 103 by specifying, for instance, attributes of interest (e.g., file types to indicate potentially applicable schemas), applicable rules for determining whether to grant access, policies incorporating those rules, and the like.

In another embodiment, the administration module 203 also may identify or generate source code, binary code, and/or other implementation libraries to enable implementation of the policies and rules for controlling access to corresponding resources 105 within the domain 103. In one embodiment, the administration module 203 may interact with a compiler 205 and/or linker 207 to identify/generate the applicable source code, binary code, and/or implementation libraries. By way of example, the compiler 205 can translate the source code for implementing the local access policy into machine readable code (e.g., binary code). The linker 207 then combines the binary code generated by the compiler 205 to generate an executable image that can be executed to manage or enforce the local access policies and related schema.

In certain embodiments, at least a portion of the local access control policy, schema, attributes, rules, source code, binary code, implementation libraries, and/or other related information may be associated with the domain 103 and/or the resources 105 of the domain 103 as metadata. The metadata, for instance, may be stored in the domain/resource database 206. In addition or alternatively, the metadata may be embedded in or attached to the resources 105 themselves.

In one embodiment, the policy manager 111 also includes a presentation module 213 to facilitate a creation and/or a modification of at least one device user interface element, at least one device user interface functionality, or a combination thereof based, at least in part, on information, data, and/or a signal resulting from any of the processes and or functions of the policy manager 111. By way of example, a device user interface element can be a display window, a prompt, an icon, and/or any other discrete part of the user interface presented at, for instance, the UE 113. In addition, a device user interface functionality refers to any process, action, task, routine, etc. that supports or is triggered by one or more of the user interface elements. For example, user interface functionality may enable speech to text recognition, haptic feedback, and the like. Moreover, it is contemplated that the presentation module 213 can operate based at least in part on processes, steps, functions, actions, etc. taken locally (e.g., local with respect to a UE 113 or the domain 103) or remotely (e.g., over another component of the communication network 117 or other means of connectivity).

In the example of FIG. 2, the policy manager 111 also includes a decision module 209. In one embodiment, the control logic 201 interacts with the decision module 209 to receive and/or otherwise act on requests to access one or more resources 105 of the domain 103. More specifically, the decision module 209 determines whether the resources 105 referenced in the request is within the domain 103 associated with the policy manager 111 (e.g., determines whether the resources 105 are within the authorization scope of the policy manager 111). If the resources 105 are within the domain 103, the decision module 209 can retrieve at least a portion of the local access policies, schema, rules, source code, binary code, implementation libraries, and the like associated with the resources 105 and then apply them to render a decision regarding whether access to the requested resources 105 is to be granted under the local access policies. In one embodiment, to render the decision, the decision module 209 can interact with the compiler 205 and/or linker 207 to generate an executable image to process the decision logic and rules according to the local access policies. Moreover, in some embodiments, the executable image and/or any of the information used to generate the executable image (e.g., attributes, rules, policies, source code, binary code, libraries, etc.) may be cached for subsequent use by the policy manager 111 in responding to similar access requests.

On rendering of a decision by decision module 209, the decision module 209 and/or the control logic 201 can interact with the enforcement module 211 so that the access decision can be implemented to explicitly allow, deny, or otherwise restrict access to the requested resources 105. In certain embodiments, the actions of the enforcement module 211 are Boolean in nature whereby access to a resource 105 is either granted or denied. As with the decision process described above, the enforcement module 211 can interact with the compiler 205 and/or linker 207 to generate an executable image for enforcing the decisions.

Figure 3:
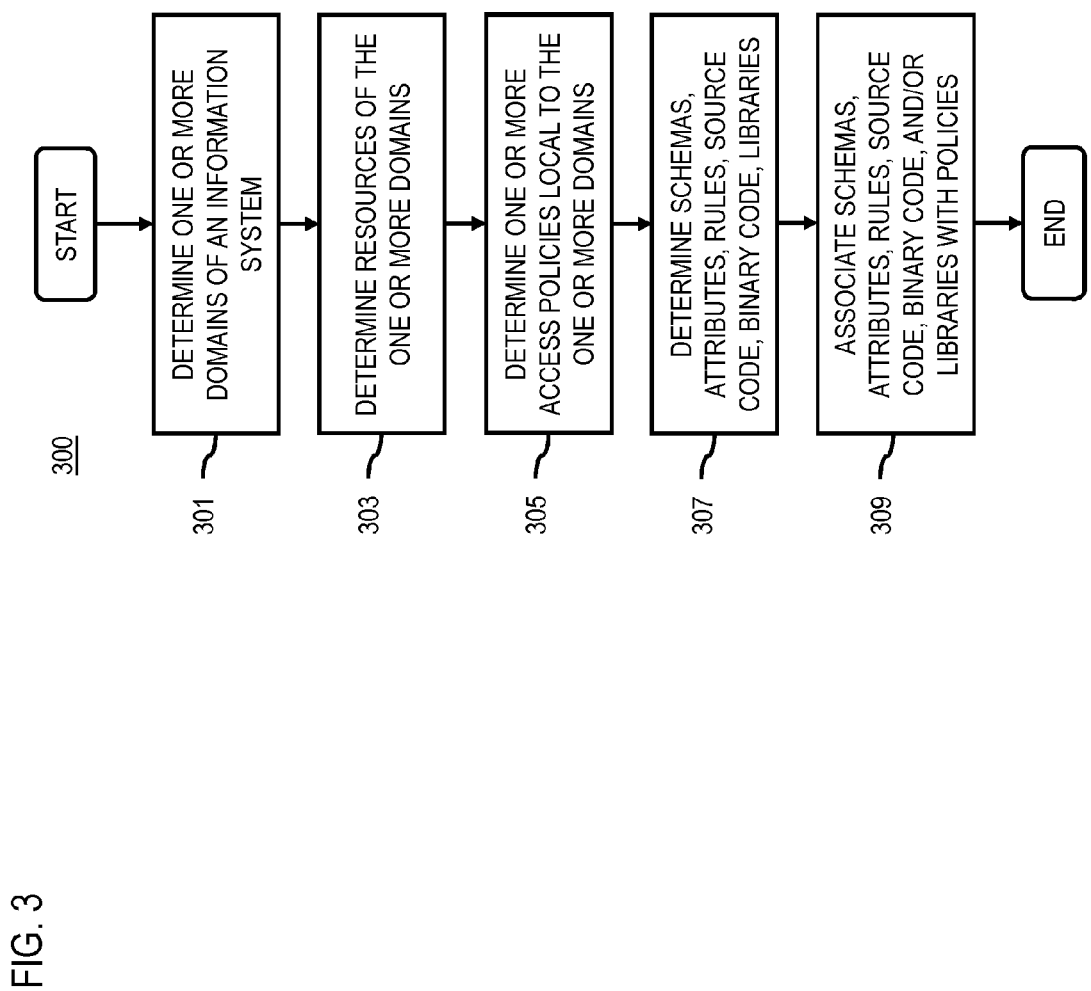
FIG. 3 is a flowchart of a process for managing distributed policies, according to one embodiment.
Figure 7:
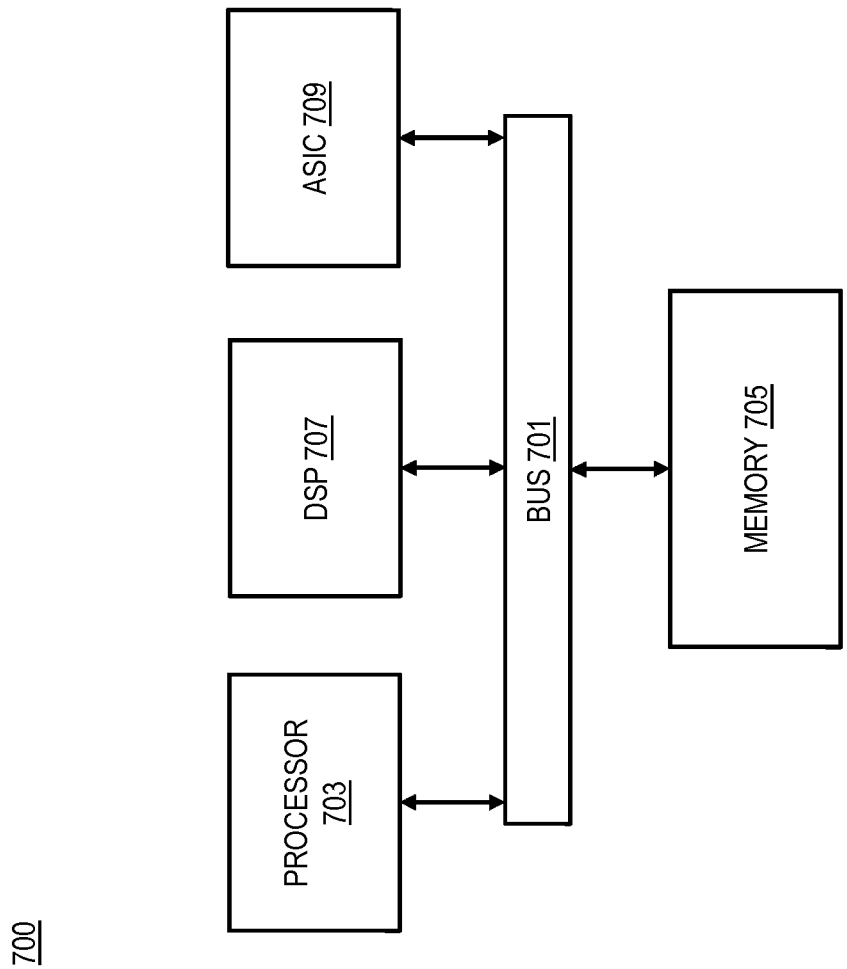
FIG. 7 is a diagram of a chip set that can be used to implement an embodiment of the invention.

FIG. 3 is a flowchart of a process for managing distributed policies, according to one embodiment. In one embodiment, the policy manager 111 performs the process 300 and is implemented in, for instance, a chip set including a processor and a memory as shown in FIG. 7. In step 301, the policy manager 111 determines one or more domains 103 of the information system 101. The one or more domains 103 correspond to respective subsets of one or more resources of the information system. The policy manager 111 then determines and/or identifies one or more resources 105 within the domain 103 (step 303).

Next, the policy manager 111 determines one or more respective access policies local to the one or more domains 103, wherein the one or more respective access policies determine at least in part access to the respective subsets, the one or more resources, or a combination thereof (step 305). At least one of the one or more respective access policies operates at least in part independently of other ones of the one or more respective access policies.

In one embodiment, the policy manager 111 can determine one or more schemas, one or more attributes, one or more rules, source code, binary code, one or more implementation libraries with respect to determining access to the respective subsets, the one or more resources 105, or a combination thereof (step 307). Next, the policy manager 111 determines to associate the one or more schemas, the one or more attributes, the one or more rules, the source code, the binary code, the one or more implementation libraries, or a combination thereof with the one or more respective access policies (step 309). In addition, the policy manager 111 can also determine one or more types of the one or more resources in the respective subsets, wherein the one or more respective access policies are based, at least in part, on the one or more types. As previously discussed, in some embodiments, the determined information may be associated with the one or more respective access policies, the one or more domains, the respective subsets, the one or more resources, or a combination thereof as metadata.

In one embodiment, the schemas, attributes, rules, source code, binary code, and/or implementation libraries can be used to support attachment of the access policies, rules, and any custom modules for applying them to the domain 103 and/or the resources 105 of the domain 103. More specifically, the policy manager 111 can attach elements specifying "managed rules" which are representations of polices in a format that can be automatically parsed and applied by the policy manager 111. By way of example, the format may be based on XACML which is an XML dialect specified explicitly for defining access control rules. Among other qualities, XACML enables access control rules to be constructed from arbitrary operations on arbitrary attributes. It is also contemplated that any other language or format may be used to specify or describe schemas, policies, and/or rules.

In one sample use case, a unary operation "A" processes input "C". XACML enables the definition of a policy rule based on the unary operation A and the XACML-defined binary "string-equals" operation as shown in Table 1.

TABLE 1 if string-equals (B, A(C))
then
    permit;

Assume also that there is a dynamically loadable library containing implementations of operation A and data extractors that can populate B and C from the type of resource this policy is associated with. By way of example, a schema describing the rule statement of Table 1 that can generate implementation code on the fly is presented in Table 2.

TABLE 2 if ( string-equals ( extract_B (resource), A ( extract_C(resource))))
then
    permit;

In other words the schema for defining implementation code can include replaceable tokens referenced based on attributes of the resources 105 to which the related access policy applies. This, in turn, makes decisions (such as whether and when to distill a state rule into an executable module, and how long to cache the generated module) more manageable by enabling the storage or association of such rules as attributes or metadata of the resources 105, their domains 103, or the type description of the resources 105. In fact, in one embodiment, the domain 103 that contains the resource 105 itself need not have knowledge of the resource's format or which of its attributes are relevant to access decisions. The policy manager 111 of the domain 103 need only have at its disposal appropriate tooling to resolve references (e.g., replaceable tokens) to dynamically loaded modules and to compile a descriptive language (e.g., XACML) into source code that can itself be compiled dynamically into a loadable and executable image or module.

Figure 4:
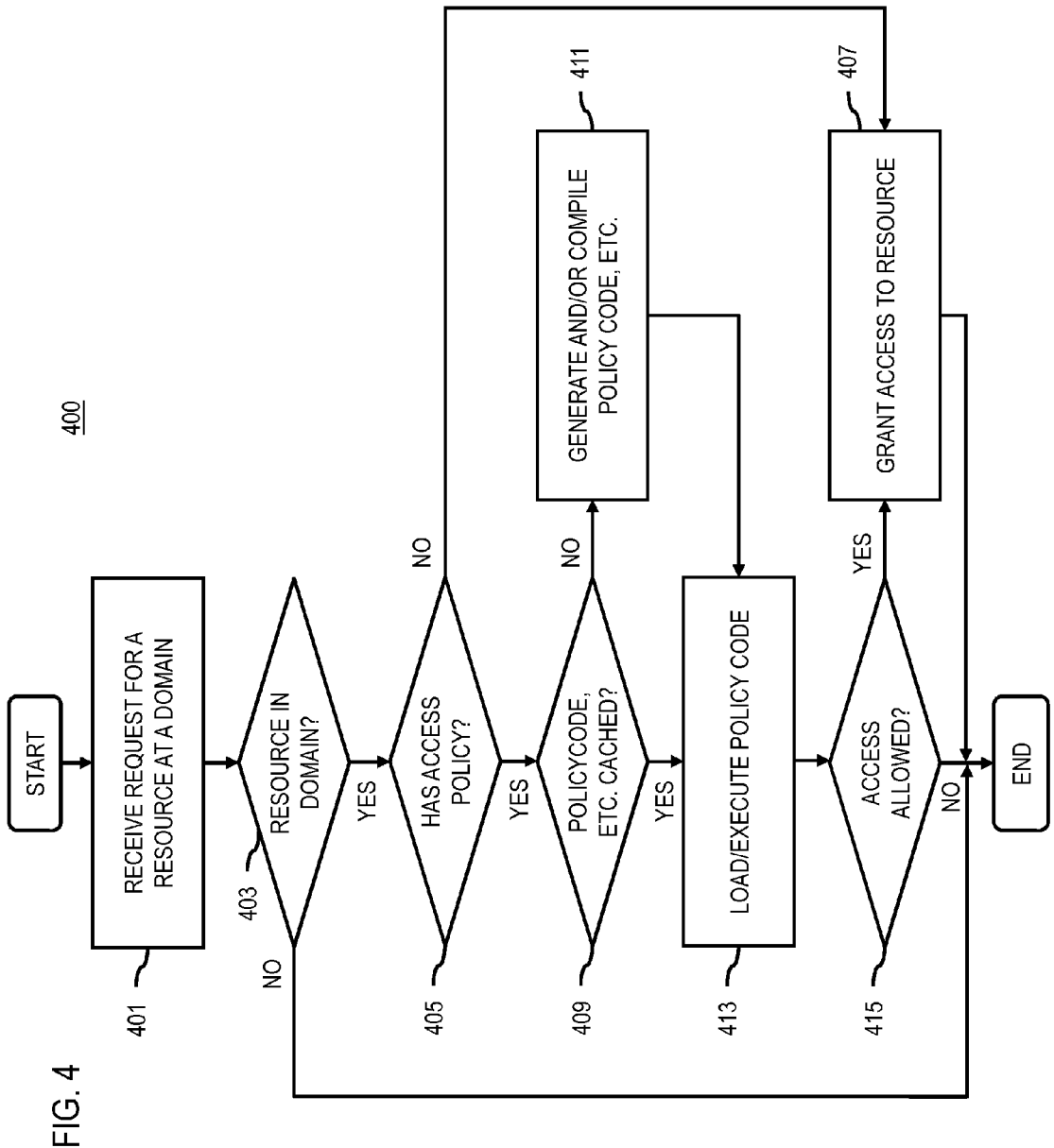
FIG. 4 is a flowchart of a process for evaluating and enforcing distributed policies, according to one embodiment.

FIG. 4 is a flowchart of a process for evaluating and enforcing distributed policies, according to one embodiment. In one embodiment, the policy manager 111 performs the process 400 and is implemented in, for instance, a chip set including a processor and a memory as shown in FIG. 7. In various embodiments, one or more access control policies and related schemas may be applied to one or more resources 105 of a domain 103 using, for instance, the process 300 of FIG. 3. The process 400 describes one embodiment for determining whether to grant or deny access to requested resources 105 according to the local access control policies of the domain 103.

In step 401, the policy manager 111 receives a request for access to at least one of the one or more resources 105 of the domain 103. The policy manager 111 first determines whether the requested resource 105 is within the domain 103 associated with the policy manager 111 and falls under the authorization scope of the policy manager 111 within the information system 101 (step 403). It is noted that under some embodiments of the distributed approach described herein, requests entering the authorization scope of the domain 103 have also passed through layers of any other domains 103 whose authorization scopes encompass the domain 103 containing the requested resource 105. In this way, requests that are denied access are rejected at the scope or domain 103 where the denial occurs, penetrating no further through nested layers of the domains 103 of the information system 101.

If the requested resource 105 is within the domain 103 of the policy manager 111, the policy manager 111 then determines whether the at least one resource is associated with at least one of the one or more respective access control policy (step 405). By way of example, the policy manager 111 retrieves metadata associated with the requested resources 105 and their corresponding domains 103 to determine whether any access control policies are in place. If there are no local access control policies, the policy manager 111 grants access to the requested resources 105 (step 407). In one embodiment, granting access includes generating and/or providing a notification that the request is successful or otherwise allowed.

Next, the policy manager 111 determines to retrieve one or more schemas, one or more attributes, one or more rules, source code, binary code, one or more implementation libraries, or a combination thereof associated with the at least one respective access control policy, the at least one requested resource 105, or a combination thereof. In one embodiment, the boundaries of the domains 103 and resources 105 enable a nested and layered approach to distributed policy management. In other words, the distributed approach described herein can operate at the outer and inner boundaries of the authorization scopes of the domains 103. For example, the outer scope boundary is the point at which control passes into a domain 103 of a collection of resources 105 that are subject to a local access control schema describing a set of access control policies/rules and their components enabling evaluation and enforcement of the policies/rules. In one embodiment, the outer boundary is the logical point at which access control policies are applied, meaning that the requested resource 105 is not accessed unless and until the authorization is provided.

In one embodiment, the decision of whether to grant, deny, or otherwise restrict the requested access is further based, at least in part, on the one or more schemas, the one or more attributes, the one or more rules, the source code, the binary code, the one or more implementation libraries, or a combination thereof. In some embodiments, the information about the target resource 105 can be used to make the access decisions. This is where the inner scope boundary comes into play. It is noted that domains 103 do not have inner boundaries, per se; instead, the scope of the domain 103 is effectively bounded by the surface of the resources 105 and/or nested domains 103 that it contains. In one embodiment, it is at this surface or inner boundary that resource attributes, metadata, etc. are acquired for making an access decision. As noted previously, these attributes may be in the form of static metadata (e.g., the format of the file, implying its schema) or dynamic information (e.g., traffic or load on the network or host). In some cases, custom modules can be specified, for instance, by the source code, binary code, implementation libraries, etc. determined with respect to the resource 105. In one embodiment, at least some of the schemas or formats of the various attributes, metadata, etc. and the lexicon in which they are evaluated can be normalized so that the access control decision at the outer boundary can be reached without specific knowledge of the schema, format, content, or behavior of the resource 105 or nested domain 103 at the inner boundary.

In one embodiment, the policy manager 111 can determine whether the information (e.g., attributes, source code, etc.) are available from a cache storage (step 409). If any of the information cannot be retrieved or is otherwise unavailable from the cache storage, the policy manager 111 determines to initiate a generation, a compilation, or a combination thereof of the one or more schemas, the one or more attributes, the one or more rules, the source code, the binary code, the one or more implementation libraries, or a combination thereof on the receiving of the request (step 411).

The generation and/or compilation results in, for instance, production of an executable image which can then by loaded and/or executed by the policy manager 111 (step 413). On running the executable image, the policy manager 111 determines or decides whether to grant or deny access according to the local access policies (step 415). If access is allow under the local policies, the policy manager 111 grants access to the requested resources 105 as described with respect to step 407 above. In one embodiment, a decision to allow access may cause the policy manager 111 to formulate or generate a response that includes tasks or actions to facilitate that access based, on for instance, the nature of the resource. For example, if the requested resource 105 is a process, granting access may include providing an interface (e.g., an application programming interface (API)) to access the functions and/or data of the process. If the requested resource 105 is a file, an attribute associated with the requester and/or the file may be changed to indicate the allowed access. It is contemplated that the actions that may be performed to grant access can be dependent on the resource 105 and the level of access requested or provided.

In some embodiments, if the access decision is to deny access, the policy manager 111 can propagate the decision to the outer scope boundary where further decisions on the disposition of the request can be made (e.g., whether the request is trapped, retried in some other form, or simply passed through if there is no consequence to the domain 103 or scope originating the denial decision).

Figure 5:
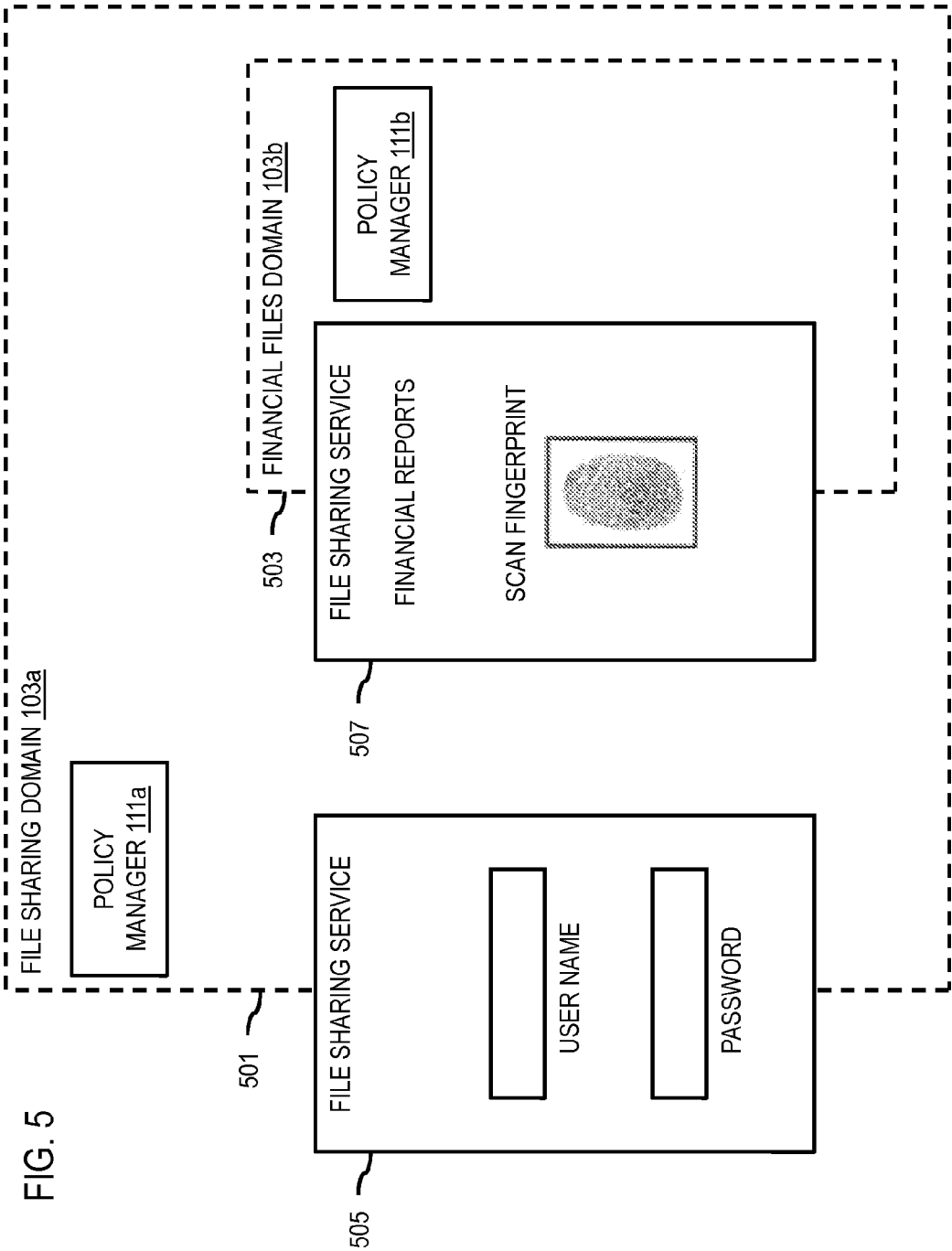
FIG. 5 is a diagram of user interfaces utilized in the processes of FIGS. 3 and 4, according to one embodiment.

FIG. 5 is a diagram of user interfaces utilized in the processes of FIGS. 3 and 4, according to one embodiment. In the example of FIG. 5, a file sharing domain 103a includes resources related to providing a file sharing service. The file sharing domain 103a also is associated with a policy manager 111a that implements distributed policy management under the approach described herein. More specifically, the policy manager 111a manages and enforces a local access control policy for access to resources within the domain 103a. The file sharing domain 103a also encompasses the financial files domain 103b which includes sensitive financial reports and records that operate under another more specific local access control schema via the policy manager 111b. In this example, the authorization scope of the policy manager 111a of the domain 103a is bounded by the outer boundary 501 of the file sharing domain 103a and the inner boundary 503 of the financial files domain 103b.

On receiving an access request to the file sharing domain 103a, the policy manager 111a presents a user interface 505 for authenticating access to the file sharing domain 103a according to its local policies and schema. In this case, the local access policies provide for rules that request a username and password combination for access to the service. The policy manager 111a can then retrieve, for instance, schemas, attributes, rules, policies, source code, binary code, implementation libraries, etc. associated with verifying the username and password combination to evaluate an access decision for the request. Access to the file sharing domain 103a includes access to the resources bounded by the outer boundary 501 and the inner boundary 503.

If a user wants access to the financial reports in the financial files domain 103b, the user can make an access request at the inner boundary 503. It is noted that in the distributed approach, the policy manager 111a of the file sharing domain 103a and the policy manager 111b operate independently. In other words, the access control policies applied and enforced at the corresponding domains 103a and 103b can operate without knowledge of the access control policies of the other domain. Nonetheless, because of the nested or layered nature of the file sharing domain 103a and the financial files domain 103b, the user is able to approach the inner boundary 503 only after successfully traversing the access control policy implemented at the outer boundary 501.

Accordingly, the policy manager 111b need not be concerned about or have knowledge of the access policy of the outer boundary 501. The policy manager 111b is focused on applying only its local access policy. In this example, the access policies and related schema for the financial files domain 103b are based on resources that are of the financial reports resource type. In this system, financial reports are treated with more restrictive access control policies to protect sensitive nature of the documents. Again, under an embodiment of this approach, knowledge of the properties of this resource type need not be propagated to the outer file sharing domain 103a, but is instead applied locally at the domain 103b where the resource type is stored. Therefore, the policy manager 111b may specify a completely different access control policy based on a different mechanism such as the biometric (e.g., fingerprint) authentication shown in the user interface 507. Under the access control policy, executable modules associated with scanning and verifying the user's fingerprint may be stored locally at the policy manager 111b. The biometric information is not shared with the file sharing domain 103a, thereby advantageously reducing the resource burden associated with implementing biometric security mechanism at the outer boundary 501 where it is not needed.

The processes described herein for providing distributed policy management and enforcement may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
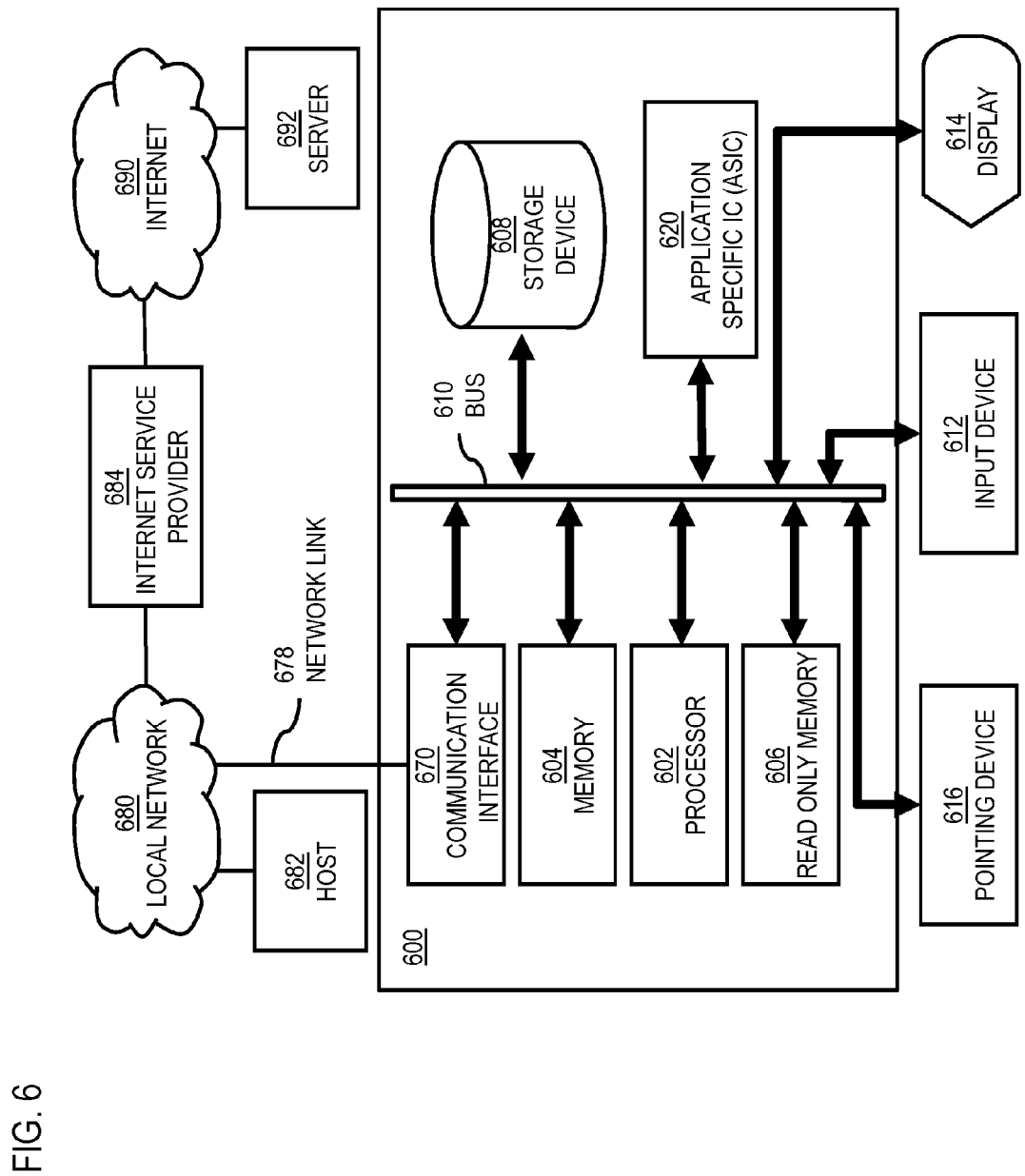
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide distributed policy management as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing distributed policy management.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to provide distributed policy management. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing distributed policy management. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing distributed policy management, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 117 for providing distributed policy management.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide distributed policy management as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing information for navigating a user interface associated with the availability of functions. Chip set or chip 700, or a portion thereof, constitutes examples of means for performing one or more steps of providing distributed policy management for various embodiments of the invention.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide distributed policy management. The memory 705 also stores the data associated with or generated by the execution of the inventive steps.

Figure 8:
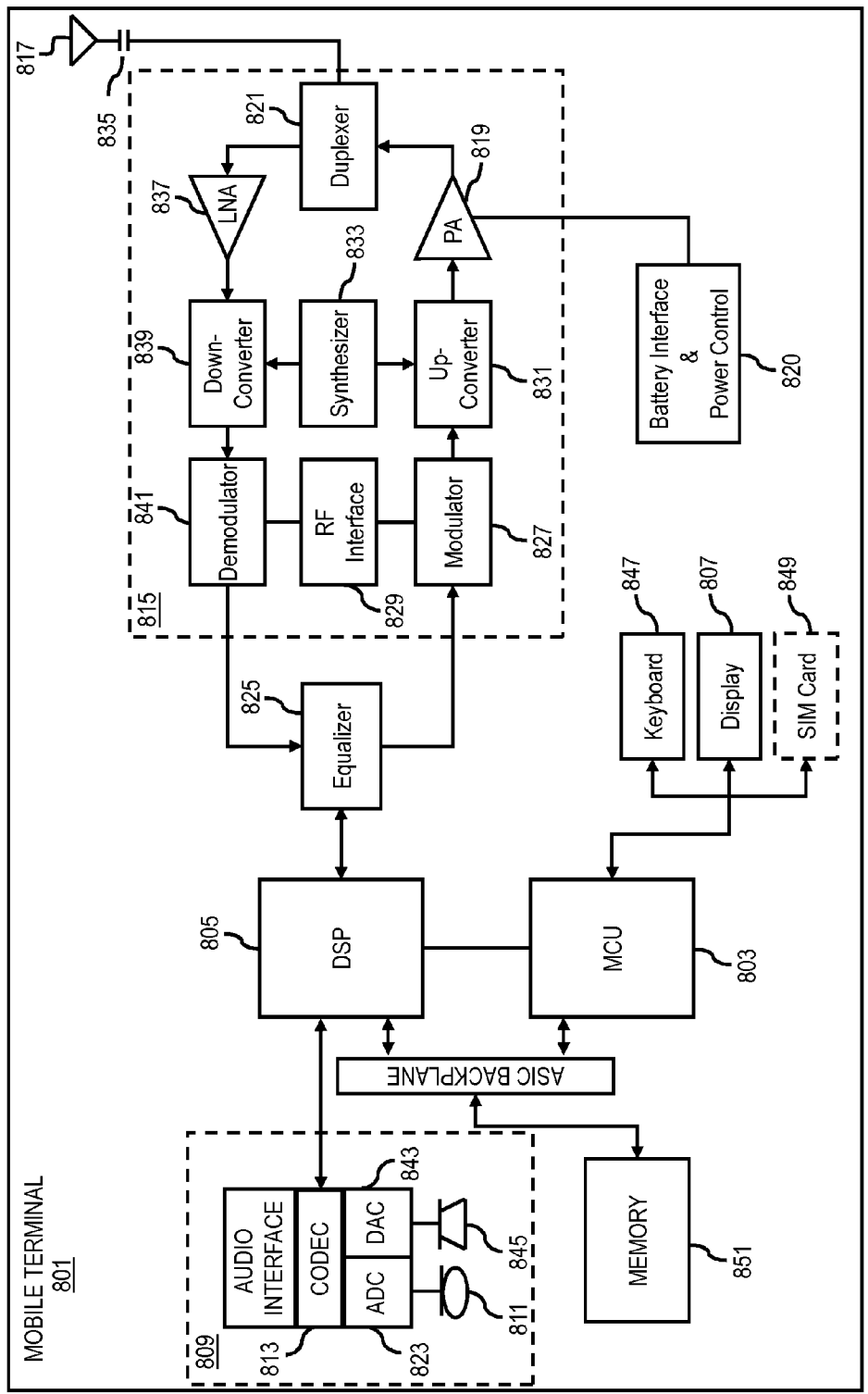
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing distributed policy management. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing distributed policy management. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide distributed policy management. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   facilitating, by a processor, a creation and/or a modification of at least one device user interface element, at least one device user interface functionality, or a combination thereof, of a user device based, at least in part, on information, data, and/or a signal resulting from:
   a local and/or remote determination of one or more domains of an information system, the one or more domains associated at least in part with respective subsets of one or more resources of the information system; and
   in response to an input at the user device by a user other than administrators of the information system, a local and/or remote generation of one or more respective access policies local to the one or more domains, the one or more respective access policies configured to enable a determination, at least in part, of access to the respective subsets, the one or more resources, or a combination thereof, wherein the one or more respective access policies are generated locally and independently from one or more other access policies applicable to the one or more domains, and the one or more respective access policies are configured to operate independently of the one or more other access policies, wherein the one or more respective access policies, the one or more domains, or a combination thereof represent at least in part successive layers of access control with respect to the respective subsets, the one or more resources, or a combination thereof, and wherein the one or more respective access policies are different from the one or more other access policies for accessing the subset, while implemented via a different mechanism.

2. A method of claim 1, wherein one or more of boundaries are defined by the user, and the one or more respective access policies are applicable at a boundary of the one or more domains and the one or more other access policies are applicable at another boundary greater than the one or more domains.

3. A method of claim 1, wherein the information, the data, and/or the signal further results from:

a local and/or remote determination of one or more types of the one or more resources in the respective subsets, wherein the one or more respective access policies are based, at least in part, on the one or more types, and wherein the one or more domains are defined, in response to a user request, by specifying one or more criteria and then evaluating one or more candidate resources against the criteria for inclusion of the respective subsets of one or more resources of the information system into the one or more domains.

4. A method of claim 1, wherein the information, the data, and/or the signal further results from:

a local and/or remote determination of one or more schemas, one or more attributes, one or more rules, source code, binary code, one or more implementation libraries with respect to determining access to the respective subsets, the one or more resources, or a combination thereof; and a local and/or remote determination to associate the one or more schemas, the one or more attributes, the one or more rules, the source code, the binary code, the one or more implementation libraries, or a combination thereof with the one or more respective access policies.

5. A method of claim 4, wherein the one or more schemas, the one or more attributes, the one or more rules, the source code, the binary code, the one or more implementation libraries, or a combination thereof are associated with the one or more respective access policies, the one or more domains, the respective subsets, the one or more resources, or a combination thereof as metadata.

6. A method of claim 1, wherein the information, the data, and/or the signal further results from:

a local and/or remote reception of a request by the user for access to at least one of the one or more resources;

a local and/or remote determination of whether the at least one resource is associated with at least one of the one or more respective access policies; and a local and/or remote determination to grant the access based, at least in part, on the determination with respect to the at least one respective access policy.

7. A method of claim 6, wherein the information, the data, and/or the signal further results from:

a local and/or remote determination to retrieve one or more schemas, one or more attributes, one or more rules, source code, binary code, one or more implementation libraries, or a combination thereof associated with the at least one respective access policy, the at least one resource, or a combination thereof, wherein the one or more attributes include traffic and/or load on the network, traffic and/or load on a host server, or a combination thereof, wherein the determining to grant the access is further based, at least in part, on the one or more schemas, the one or more attributes, the one or more rules, the source code, the binary code, the one or more implementation libraries, or a combination thereof.

8. A method of claim 7, wherein the information, the data, and/or the signal further results from:

a local and/or remote determination to initiate a generation, a compilation, or a combination thereof of the one or more schemas, the one or more attributes, the one or more rules, the source code, the binary code, the one or more implementation libraries, or a combination thereof on the receiving of the request by the user.

9. A method of claim 7, wherein the information, the data, and/or the signal further results from:

a local and/or remote determination to store the one or more schemas, the one or more attributes, the one or more rules, the source code, the binary code, the one or more implementation libraries, or a combination thereof in a cache, wherein one or more subsequent requests by the user for access to the at least one resource is based, at least in part, on the cache.

10. A method of claim 7, wherein the one or more schemas, the one or more attributes, the one or more rules, the source code, the binary code, the one or more implementation libraries, or a combination thereof are parsed from metadata associated with the at least one respective schema, the at least one resource, or a combination thereof, and wherein at least some of the schemas of the one or more attributes, the one or more rules, or a combination thereof, are normalized, and the one or more attributes, the one or more rules, or a combination thereof, are evaluated based on the at least some of the schemas.

11. A method comprising facilitating access to at least one interface, the interface allowing access to at least one service, the service configured to perform the method of:

determining, by a processor, one or more domains of an information system, the one or more domains associated at least in part with respective subsets of one or more resources of the information system; and in response to an input at a user device by a user other than administrators of the information system, generating by the processor one or more respective access policies local to the one or more domains, the one or more respective access policies configured to enable a determination at least in part of access to the respective subsets, the one or more resources, or a combination thereof, wherein the one or more respective access policies are generated locally and independently from one or more other access policies applicable to the one or more domains, and the one or more respective access policies are configured to operate independently of the one or more other access policies, wherein the one or more respective access policies, the one or more domains, or a combination thereof represent at least in part successive layers of access control with respect to the respective subsets, the one or more resources, or a combination thereof, and wherein the one or more respective access policies are different from the one or more other access policies for accessing the subset, while implemented via a different mechanism.

12. A method of claim 11, wherein the service is further configured to:

determine one or more schemas, one or more attributes, one or more rules, source code, binary code, one or more implementation libraries with respect to determining access to the respective subsets, the one or more resources, or a combination thereof; and determine to associate the one or more schemas, the one or more attributes, the one or more rules, the source code, the binary code, the one or more implementation libraries, or a combination thereof with the one or more respective access policies, wherein one or more of the boundaries are defined by the user as surrounding at least one identical subset of the resources, and the one or more respective access policies are more restrictive than the one or more other access policies for accessing the subset, while implemented via a different mechanism.

13. A method of claim 11, wherein the service is further configured to:

receive a request for access to at least one of the one or more resources;

determine whether the at least one resource is associated with at least one of the one or more respective access policies; and determine to grant the access based, at least in part, on the determination with respect to the at least one respective access policy.

14. A method comprising:

determining, by a processor, one or more domains of an information system, the one or more domains associated at least in part with respective subsets of one or more resources of the information system; and in response to an input at a user device by a user other than administrators of the information system, generating by the processor one or more respective access policies local to the one or more domains, the one or more respective access policies configured to enable a determination at least in part of access to the respective subsets, the one or more resources, or a combination thereof, wherein the one or more respective access policies are generated locally and independently from one or more other access policies applicable to the one or more domains, and the one or more respective access policies are configured to operate independently of the one or more other access policies, wherein the one or more respective access policies, the one or more domains, or a combination thereof represent at least in part successive layers of access control with respect to the respective subsets, the one or more resources, or a combination thereof, and wherein the one or more respective access policies are different from the one or more other access policies for accessing the subset, while implemented via a different mechanism.

15. A method of claim 14, further comprising:

determining one or more schemas, one or more attributes, one or more rules, source code, binary code, one or more implementation libraries with respect to determining access to the respective subsets, the one or more resources, or a combination thereof; and determining to associate the one or more schemas, the one or more attributes, the one or more rules, the source code, the binary code, the one or more implementation libraries, or a combination thereof with the one or more respective access policies.

16. A method of claim 14, further comprising:

receiving a request for access to at least one of the one or more resources;

determining whether the at least one resource is associated with at least one of the one or more respective access policies; and determining to grant the access based, at least in part, on the determination with respect to the at least one respective access policy.

17. A method of claim 6, wherein the information, the data, and/or the signal further results from:

an identification or generation of source code, binary code, and/or other implementation libraries to enable implementation of the access policies for controlling access to the respective subsets of one or more resources of the information system via a plurality of boundary points, on the receiving of the request by the user; and a coordination of the boundary points for the implementation of the access policies.

18. A method of claim 2, further comprising:

obtaining one or more resource attributes at each of the boundaries for making a resource access decision, wherein the one or more resource attributes include metadata of schemas, attributes, rules, source codes, binary codes, libraries, network operation information, or a combination thereof.

19. A method of claim 18, further comprising:

determining one or more replaceable tokens referenced upon at least the one or more resource attributes; and defining policy implementation code based, at least in part, on the one or more replaceable tokens.

20. A method of claim 19, further comprising:

defining one or more policy rules based on a unary operation, a descriptive language-defined binary string-equals operation, or a combination thereof; and associating the one or more policy rules as the one or more resource attributes.

* * * * *